(No Model.)

Z. LATSHAW.
SEWER VALVE.

No. 604,117. Patented May 17, 1898.

Attest:
Edw. F. Kinsey,
Drew Wyckoff Hageman

Inventor.
Zachariah Latshaw,
per Thomas S. Crane, Atty.

ID: No

UNITED STATES PATENT OFFICE.

ZACHARIAH LATSHAW, OF NEW YORK, N. Y., ASSIGNOR TO CHARLES R. HIGGINS, OF SAME PLACE.

SEWER-VALVE.

SPECIFICATION forming part of Letters Patent No. 604,117, dated May 17, 1898.

Application filed November 19, 1897. Serial No. 659,092. (No model.)

*To all whom it may concern:*

Be it known that I, ZACHARIAH LATSHAW, a citizen of the United States, residing at New York, county of New York, State of New York, have invented certain new and useful Improvements in Sewer-Valves, fully described and represented in the following specification and the accompanying drawings, forming a part of the same.

The object of this invention is to provide a sewer-valve or valve for similar pipes in which the valve-seat can be made of different metal and conveniently secured within the pipe.

In previous constructions the valve-seat has been sometimes formed with a flange secured between adjacent flanges upon the ends of abutting pipes, and it has also been secured upon the end of the pipe itself and the pipe connected with the valve-casing by various means.

The present invention is intended to furnish an economical and effective means of introducing the valve-seat into the hub of a hub-and-spigot pipe-line, by which means the sewer-valve may be fitted to ordinary hub-and-spigot pipes, and no special fittings are required to connect it to such pipes or to provide it with the valve-seat. To effect these objects, I form the valve-casing with a hub and spigot upon its opposite ends and construct the valve-seat of tubular form, with a collar to rest in the bottom of the hub and smaller than the interior of the hub, so as to leave a space between the margin of such collar and the inner wall of the hub to admit a suitable packing. The collar carrying the valve-seat is thus secured in the bottom of the hub without filling any more space than the mere thickness of the collar, leaving the remainder of the space within the hub to secure the spigot therein, such spigot being supported at its inner end against the collar when its own packing is applied.

The tube forming the valve-seat is preferably provided with hinge-lugs and the valve hinged thereto, so that when the seat is secured in the bore of the pipe the valve may be in proper adjustment to the seat.

The construction is especially adapted to hub-and-spigot pipes, as my valve-casing requires a hub at one end to receive the collar of the valve-seat, and such hub is also adapted to receive the spigot upon a connecting-pipe.

The entire valve-fitting may be provided upon the top with a removable cap to give access to the valve.

In the annexed drawings I have shown the valve applied to a straightway pipe and also to a trap, the valve serving in both cases to prevent backflow through the pipe.

Figure 1:
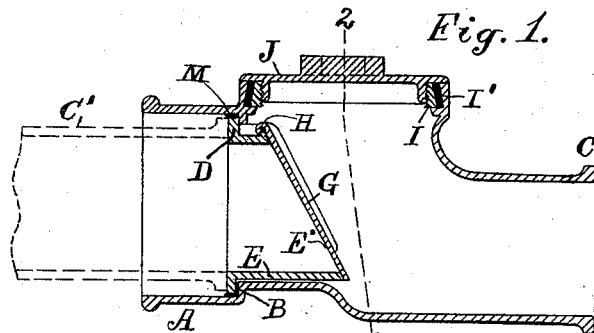
Figure 2:
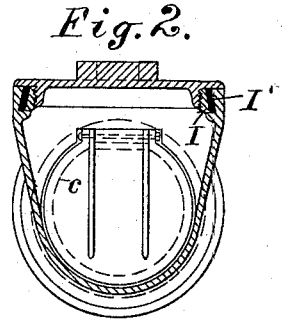
Figure 3:
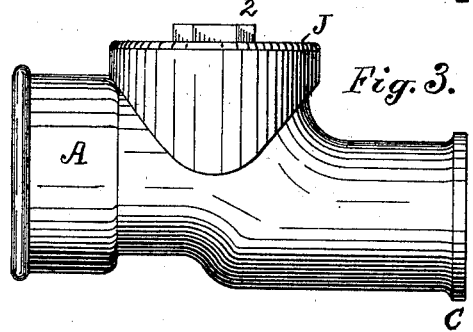
Figure 4:
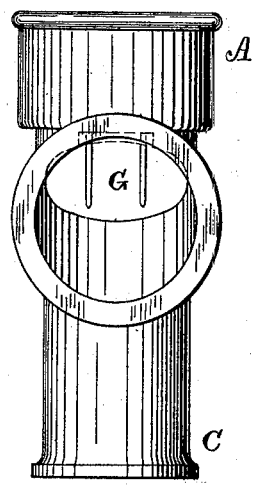
Figure 5:
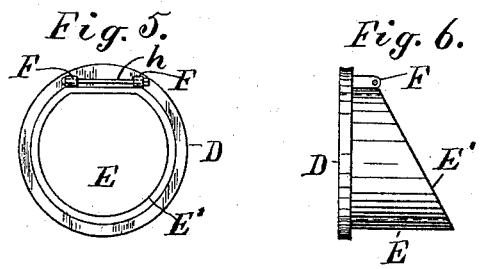
Figure 6:
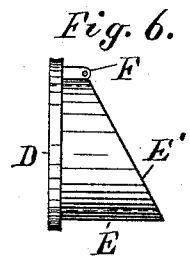
Figure 7:
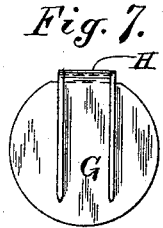
Figure 8:
Figure 9:
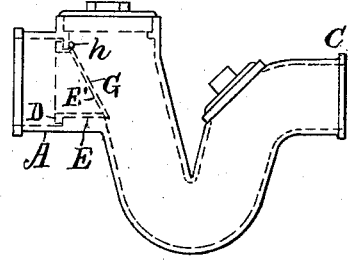

Figure 1 is a longitudinal section of the straightway fitting. Fig. 2 is a cross-section of the same on line 2 2 in Fig. 1. Fig. 3 is a side elevation, and Fig. 4 a plan, of the same. Fig. 5 shows the inner end of the valve-seat, and Fig. 6 a side elevation of the same as detached from the valve-casing. Fig. 7 is an elevation, and Fig. 8 an edge view, of the valve detached from the seat; and Fig. 9 is a side elevation of a trap provided with my improved seat, the interior of the structure being indicated by dotted lines.

In Figs. 1 to 6, A designates the hub at one end of the valve-casing, B the shoulder at the bottom of such hub, and C the spigot at the opposite end of said casing.

D is the collar upon the tube E, whose inner end is cut upon a slant to form the valve-seat E'. The valve-seat tube E is upon its upper side provided with hinge-lugs F, and the valve G is formed with a lug H, to be pivoted with such lugs by a pivot-pin $h$. The pin is shown secured in the hinge-lugs F, and the lug H upon the valve is shown in Fig. 8 notched to slip laterally over such pin, so that it may be lifted clear of the pivot when it is necessary to remove the valve from the casing. The lug H is notched upon the lower side, so that the weight of the valve tends to hold it upon the pin in the normal operation of the valve.

It is immaterial whether the pin be attached permanently to the lugs upon the seat or the lug upon the valve, provided the opposite lugs are notched to permit the removal of the valve when required.

Where the pin is secured in a lug or lugs upon the valve, the notches in the lugs upon the seat would be open upon their upper sides, as the weight of the valve would then press the pin downwardly in such notches.

The diameter of the collar D is made enough smaller than the bore of the hub to admit a packing M, as lead, which may be poured in and calked to make a water-tight joint, as is common in making spigot-joints. The collar thus holds the valve-seat in water-tight connection with the pipe, so that when the valve is closed the passage through the pipe is entirely shut. The packing M is applied exclusively between the margin of the collar and the inner wall of the hub, so that the depth of the hub outside of the collar is adapted to receive the spigot upon a connecting-pipe. The collar in such case forms the bottom of the hub, in which the spigot of a pipe may be secured in the usual manner in the position indicated by dotted lines C' in Fig. 1, the collar serving to support the spigot when the latter is jammed into its place by the calking of the packing around such spigot.

A hand-hole is formed in the side of the casing above the valve and provided with a threaded seat I, and a hand-hole cover J is shown fitted removably to such seat. The threaded seat for the hand-hole is shown secured in the casing by a lead joint l' in the usual manner, and the cover is made of sufficient size to remove the valve when required. The chamber between the cover and the valve is made wider than the bore of the casing, (indicated by the dotted line c in Fig. 2,) as is clearly shown in Figs. 2 and 4, to permit the valve to move freely during the passage of the liquid and to facilitate its convenient removal through the hand-hole when necessary.

The trap-fitting shown in Fig. 9 is provided with the hub A and spigot C and with the hand-hole cover J upon the top adjacent to the hub. The valve-seat is shown fitted by its collar D within the socket of the hub, and the construction thus operates the same as described for the straightway pipe.

By employing a lead packing to secure the seat within the hub I use a well-known means of making a water-tight joint and wholly avoid any expensive fitting between the brass and iron parts.

It is not new to connect a valve-seat with a socket by a lead packing; but in my construction the hub A and collar D each perform a double function, as the hub serves not only to secure the collar (which carries the valve-seat) in the end of the casing, but it also serves to receive the spigot C' upon the end of the connecting-pipe, while the collar not only serves to carry the valve-seat, but forms the bottom of the hub for such spigot during the packing of the same and the calking of the packing between the spigot and the hub. These functions are secured by making the collar smaller than the inner wall of the hub and applying the lead packing for the collar exclusively at the margin of the collar, so as to leave the remainder of the hub entirely unobstructed.

From the above description it will be seen that my sewer-valve is for use with hub-and-spigot pipes and that I have utilized the hub upon the valve-casing in a novel manner to secure the valve-seat therein.

Having thus set forth the nature of the invention, what is claimed herein is—

1. A sewer-valve constructed for use with hub-and-spigot pipes and having the valve-casing with spigot C at one end, and at the opposite end the hub A to receive the spigot C' of the connecting-pipe, and provided with shoulder B at the bottom, the collar D with valve-tube E extended therefrom and formed with inclined end to provide the valve-seat, as set forth, the lead packing M between the margin of the collar and the inner wall of the hub, the valve G hinged to such tube to fit the seat, a hand-hole with cover J in the side of the casing above such valve, and a chamber, between such cover and valve-seat, of greater width than the pipe, to permit the free movement of the valve, substantially as herein set forth.

2. A sewer-valve constructed for use with hub-and-spigot pipes, and comprising the valve-casing with spigot C at one end, and at the opposite end the hub A to receive the spigot C' of the connecting-pipe, and provided with shoulder B at the bottom, the collar D having marginal lead packing M, and the valve-tube E projected through the shoulder and made smaller than the same, with the hinge-lugs F formed thereon and adapted to pass through the shoulder, as set forth, the valve G having lug H fitted detachably between the lugs F, the pivot-pin h extended through the lugs to engage the same detachably, and the hand-hole with cover J in the side of the casing above such valve, the whole arranged and operated substantially as herein set forth.

In testimony whereof I have hereunto set my hand in the presence of two subscribing witnesses.

ZACHARIAH LATSHAW.

Witnesses:
W. H. VAN STERNBERGH,
JACOB MARX.